US00RE43155E

(19) United States
(12) Reissued Patent
Allen et al.

(10) Patent Number: US RE43,155 E
(45) Date of Reissued Patent: Feb. 7, 2012

(54) HOSPITAL BED AND MATTRESS HAVING A RETRACTABLE FOOT SECTION

(75) Inventors: E. David Allen, Okeana, OH (US); Kenneth L. Kramer, Tai Po (HK); Peter M. Wukusick, Batesville, IN (US); Eric R. Meyer, Greensburg, IN (US); Gregory W. Branson, Batesville, IN (US); David J. Ulrich, Sunman, IN (US); James M. C. Thomas, Mt. Pleasant, SC (US); Paul J. McDaniel, III, Holly Springs, NC (US); Dennis R. Zwink, Batesville, IN (US)

(73) Assignee: Hill-Rom Services, Inc., Batesville, IN (US)

(21) Appl. No.: 12/536,543

(22) Filed: Aug. 6, 2009

Related U.S. Patent Documents

Reissue of:
(64) Patent No.: 7,216,384
Issued: May 15, 2007
Appl. No.: 11/315,665
Filed: Dec. 22, 2005

U.S. Applications:
(60) Continuation of application No. 10/770,721, filed on Feb. 3, 2004, now Pat. No. 7,000,272, which is a continuation of application No. 10/327,422, filed on Dec. 20, 2002, now Pat. No. 6,684,427, which is a continuation of application No. 09/755,583, filed on Jan. 5, 2001, now Pat. No. 6,496,993, which is a division of application No. 09/120,125, filed on Jul. 22, 1998, now Pat. No. 6,212,714, which is a continuation-in-part of application No. 09/018,542, filed on Feb. 4, 1998, now Pat. No. 6,163,903, which is a continuation of application No. 08/511,711, filed on Aug. 4, 1995, now Pat. No. 5,715,548, said application No. 09/120,125 is a continuation-in-part of application No. 08/901,840, filed on Jul. 28, 1997, now Pat. No. 6,151,739, which is a continuation of application No. 08/367,829, filed on Jan. 3, 1995, now Pat. No. 5,666,681, said application No. 09/120,125 is a division of application No. 08/511,711.

(60) Provisional application No. 60/059,772, filed on Sep. 23, 1997.

(51) Int. Cl.
*A61G 7/10* (2006.01)

(52) U.S. Cl. ..... 5/618; 5/624

(58) Field of Classification Search ..... 5/613–618, 5/624

See application file for complete search history.

(56) References Cited

U.S. PATENT DOCUMENTS 12,994 A * 6/1855 Coogan ..... 210/307

(Continued)

FOREIGN PATENT DOCUMENTS

DE 2310603 9/1974

(Continued)

OTHER PUBLICATIONS

Supplementary European Search Report from EP 03 75 9227 dated Jul. 9, 2009.

(Continued)

*Primary Examiner* — Michael Trettel
(74) *Attorney, Agent, or Firm* — Barnes & Thornburg LLP

(57) ABSTRACT

A patient support is disclosed having an adjustable length deck and a mattress positionable on the deck.

28 Claims, 14 Drawing Sheets

U.S. PATENT DOCUMENTS 585,834 A * 7/1897 Ruth ..... 5/711
595,734 A * 12/1897 Rand et al. ..... 5/710
598,054 A * 1/1898 Meany ..... 5/711
1,261,040 A * 4/1918 Lanes ..... 297/68
1,398,203 A * 11/1921 Schmidt ..... 5/618
2,245,909 A * 6/1941 Enfiajian ..... 5/710
2,281,209 A * 4/1942 Smith ..... 5/618
2,452,366 A * 10/1948 Freund ..... 5/624
2,556,691 A * 6/1951 Harshbarger ..... 15/236.02
2,564,083 A * 8/1951 Stechert ..... 5/618
2,605,151 A * 7/1952 Shampaine ..... 5/602
2,766,463 A * 10/1956 Bendersky ..... 5/623
2,799,545 A 7/1957 Berne
2,869,614 A * 1/1959 Wamsley ..... 280/230
3,003,160 A * 10/1961 Goodman ..... 5/618
3,010,121 A * 11/1961 Breach ..... 5/618
3,053,568 A * 9/1962 Miller ..... 297/78
3,099,440 A * 7/1963 Burzlaff ..... 5/614
3,112,500 A * 12/1963 MacDonald ..... 5/618
3,138,805 A * 6/1964 Piazza ..... 5/618
3,195,151 A * 7/1965 Boyer ..... 5/624
3,210,779 A * 10/1965 Herbold ..... 5/610
3,220,021 A * 11/1965 Nelson ..... 5/618
3,220,022 A * 11/1965 Nelson ..... 5/618
3,222,693 A 12/1965 Pruim et al.
3,233,255 A * 2/1966 Propst ..... 5/610
3,239,853 A * 3/1966 MacDonald ..... 5/616
3,309,717 A * 3/1967 Black ..... 5/618
3,336,606 A * 8/1967 Beitzel ..... 5/610
3,406,772 A * 10/1968 Ahrent et al. ..... 180/9.23
3,411,766 A * 11/1968 Lanigan ..... 5/619
3,456,269 A * 7/1969 Goodman ..... 5/618
3,640,566 A * 2/1972 Hodge ..... 297/68
3,665,528 A * 5/1972 Kjellberg et al. ..... 5/618
3,754,749 A * 8/1973 Lyon et al. ..... 5/618
3,814,414 A * 6/1974 Chapa ..... 5/601
3,822,425 A * 7/1974 Scales ..... 5/710
3,845,947 A * 11/1974 Lee ..... 5/613
3,893,197 A * 7/1975 Ricke ..... 5/651
3,897,973 A * 8/1975 Long et al. ..... 297/75
3,905,591 A * 9/1975 Schorr et al. ..... 5/601
3,916,461 A * 11/1975 Kerstholt ..... 5/618
3,932,903 A * 1/1976 Adams et al. ..... 5/100
4,127,906 A * 12/1978 Zur ..... 5/615
4,139,917 A * 2/1979 Fenwick ..... 5/602
4,168,099 A * 9/1979 Jacobs et al. ..... 297/325
4,183,015 A 1/1980 Drew et al.
4,183,109 A * 1/1980 Howell ..... 5/618
4,193,149 A * 3/1980 Welch ..... 5/713
4,225,989 A * 10/1980 Corbett et al. ..... 5/713
4,227,269 A * 10/1980 Johnston ..... 5/611
4,240,169 A * 12/1980 Roos ..... 5/613
4,258,445 A * 3/1981 Zur ..... 5/614
4,312,500 A * 1/1982 Janssen ..... 5/618
4,336,621 A * 6/1982 Schwartz et al. ..... 5/658
4,369,535 A * 1/1983 Ekkerink ..... 5/690
4,407,030 A * 10/1983 Elliott ..... 5/616
4,409,695 A * 10/1983 Johnston et al. ..... 5/601
4,411,035 A * 10/1983 Fenwick ..... 5/602
4,453,732 A * 6/1984 Assanah et al. ..... 280/648
4,534,077 A * 8/1985 Martin ..... 5/424
4,542,547 A * 9/1985 Sato ..... 5/713
4,545,084 A * 10/1985 Peterson ..... 5/618
4,557,471 A * 12/1985 Pazzini ..... 5/618
4,653,129 A * 3/1987 Kuck et al. ..... 5/430
4,675,926 A * 6/1987 Lindblom et al. ..... 5/618
4,682,376 A * 7/1987 Feldt ..... 5/602
4,685,159 A * 8/1987 Oetiker ..... 5/608
4,751,754 A * 6/1988 Bailey et al. ..... 5/611
4,769,584 A * 9/1988 Irigoyen et al. ..... 318/648
4,797,962 A * 1/1989 Goode ..... 5/713
4,811,435 A * 3/1989 Foster et al. ..... 5/600
4,826,529 A * 5/1989 Covey et al. ..... 504/261
4,847,929 A * 7/1989 Pupovic ..... 5/608
4,856,123 A * 8/1989 Henderson et al. ..... 4/480
4,858,260 A * 8/1989 Failor et al. ..... 5/618
4,862,529 A * 9/1989 Peck ..... 5/611
4,862,530 A * 9/1989 Chen ..... 5/618
4,894,876 A * 1/1990 Fenwick ..... 5/602
4,944,055 A * 7/1990 Shainfeld ..... 5/618
4,968,013 A * 11/1990 Kuck ..... 5/600
4,974,905 A * 12/1990 Davis ..... 297/377
5,040,253 A * 8/1991 Cheng ..... 5/616
5,072,463 A * 12/1991 Willis ..... 5/618
5,077,843 A * 1/1992 Dale et al. ..... 5/600
5,095,561 A * 3/1992 Green et al. ..... 5/618
5,103,519 A * 4/1992 Hasty ..... 5/715
5,105,486 A * 4/1992 Peterson ..... 5/611
5,129,117 A * 7/1992 Celestina et al. ..... 5/602
5,148,562 A * 9/1992 Borders et al. ..... 5/610
5,157,787 A * 10/1992 Donnellan et al. ..... 5/610
5,157,800 A * 10/1992 Borders ..... 5/602
5,193,633 A * 3/1993 Ezenwa ..... 180/65.1
5,205,004 A * 4/1993 Hayes et al. ..... 5/611
5,230,113 A * 7/1993 Foster et al. ..... 5/608
5,235,258 A * 8/1993 Schuerch ..... 318/16
5,235,713 A * 8/1993 Guthrie et al. ..... 5/710
5,267,364 A * 12/1993 Volk ..... 5/713
5,279,010 A * 1/1994 Ferrand et al. ..... 5/600
5,300,926 A 4/1994 Stoeckl
5,367,728 A * 11/1994 Chang ..... 5/689
5,454,126 A * 10/1995 Foster et al. ..... 5/618
5,469,588 A * 11/1995 DiMatteo et al. ..... 5/81.1 C
5,479,666 A * 1/1996 Foster et al. ..... 5/624
5,481,769 A * 1/1996 Schneider ..... 5/617
5,577,279 A * 11/1996 Foster et al. ..... 5/618
5,666,681 A * 9/1997 Meyer et al. ..... 5/727
5,701,618 A * 12/1997 Brugger ..... 5/611
5,715,548 A * 2/1998 Weismiller et al. ..... 5/624
5,745,937 A * 5/1998 Weismiller et al. ..... 5/624
5,906,017 A 5/1999 Ferrand et al.
5,934,280 A * 8/1999 Viard et al. ..... 128/845
5,940,910 A * 8/1999 Weismiller et al. ..... 5/600
6,089,593 A * 7/2000 Hanson et al. ..... 280/650
6,154,899 A * 12/2000 Brooke et al. ..... 5/81.1 R
6,212,714 B1 * 4/2001 Allen et al. ..... 5/624
6,496,993 B2 * 12/2002 Allen et al. ..... 5/624
6,684,427 B2 * 2/2004 Allen et al. ..... 5/624
6,739,004 B1 * 5/2004 Abrahamsen et al. ..... 5/610
6,910,236 B2 * 6/2005 Rene ..... 5/624
6,968,584 B1 11/2005 Lafleche
2004/0221391 A1 * 11/2004 Allen et al. ..... 5/624

FOREIGN PATENT DOCUMENTS

EP 0 218 301 A2 4/1987
EP 0 341 570 A2 11/1989
EP 0 349 067 A1 1/1990
EP 0 349 067 B1 10/1990
EP 0 485 362 A3 5/1992
GB 2 015 872 A 9/1979
GB 2 169 195 A 7/1986
GB 2 313 303 A 11/1997
NL 6716888 6/1969
WO WO 99/15126 4/1999
WO WO 99/52487 A1 10/1999
WO 01/74286 A 10/2001

OTHER PUBLICATIONS

European Search Report for EP 10 17 9937, dated Jun. 29, 2011, 5 pages.
European Search Report for EP 10 17 9960, dated Jul. 6, 2011, 5 pages.
Akroteck 4000 Brochure, LUMEX, 1992.
"Impression™", Brochure, Kinetic Concepts, Inc., Aug. 1996.

* cited by examiner

HOSPITAL BED AND MATTRESS HAVING A RETRACTABLE FOOT SECTION

Matter enclosed in heavy brackets [ ] appears in the original patent but forms no part of this reissue specification; matter printed in italics indicates the additions made by reissue.

This *is a reissue application of U.S. patent application Ser. No. 11/315,665, now U.S. Pat. No. 7,216,384, which* is a continuation of U.S. patent application Ser. No. 10/770,721, filed Feb. 3, 2004 now U.S. Pat. No. 7,000,272, *which is a continuation of U.S. patent application Ser. No. 10/327,422, filed on Dec. 20, 2002, now U.S. Pat. No. 6,684,427,* which is a continuation of U.S. patent application Ser. No. 09/755,583, filed Jan. 5, 2001, now U.S. Pat. No. 6,496,993, which is a divisional of U.S. patent application Ser. No. 09/120,125, filed Jul. 22, 1998, now U.S. Pat. No. 6,212,714, which *is a continuation-in-part of U.S. patent application Ser. No. 09/018,542, filed on Feb. 4, 1998, now U.S. Pat. No. 6,163,903, which is a continuation of U.S. patent application Ser. No. 08/511,711, filed on Aug. 4, 1995, now U.S. Pat. No. 5,715,548, and said application Ser. No. 09/120,125,* is a continuation-in-part of U.S. patent application Ser. No. 08/901,840, filed Jul. 28, 1997, now U.S. Pat. No. 6,151,739, which is a continuation of U.S. patent application Ser. No. 08/367,829, filed Jan. 3, 1995, now U.S. Pat. No. 5,666,681; [a continuation-in-part of U.S. patent application Ser. No. 09/018,542, filed Feb. 4, 1998, now U.S. Pat. No. 6,163,903;] and *said application Ser. No. 09/120,125 is* a divisional of U.S. patent application Ser. No. 08/511,711 filed Aug. 4, 1995, now U.S. Pat. No. 5,715,548 and claims benefit of U.S. Provisional Patent Application No. 60/059,772, filed Sep. 23, 1997 with respect to common subject matter. The disclosures of the above patent applications are expressly incorporated by reference herein.

BACKGROUND AND SUMMARY OF THE INVENTION

The present invention relates generally to adjustable beds and more specifically to a bed having an improved adjustable foot section.

There are many known bed designs that have adjustable foot sections. On beds that convert from a planar bed configuration to an upright chair configuration, the foot section is generally shortened as the foot section rotates from a horizontal to a vertical position. There are also beds having adjustable lengths wherein an attendant physically repositions the head or foot section of the bed to the desired length. These designs include a sliding telescopic foot section as well as a folding foot section equivalent to a "lazy boy" design. It is also known to deflate the foot section of the mattress when converting from a bed to a chair. For short occupants, there exists a need for adjustment of the foot prop or board in the chair position shorter than that attended by adjusting the length of the foot section.

The ability to adjust the length of the foot section independent of converting from a bed to a chair is also important. This would assist in maneuvering the bed in a confined locations during patient transport. It also allows the bed length to be customized to a patient's size. If a foot prop is provided at the end of the foot section, the adjustment of the foot section and the prop would prevent patient migration across the support surface of the bed. It would also provide support for the feet to thereby improve the patient's feeling of security. It could also be used in the prevention of peripheral neuropathy ("foot drop"). Positioning the end of the mattress relative to the patient substantially increases the ability to provide heel management. Heel management is wherein the heel is supported by the thigh and the calf and the heel has reduced pressure contact with the mattress.

Certain individuals who are confined to bed for an extended period of time are vulnerable to skin breakdown on the back of the heel. Protection of the skin in this area is important if initial indications of tissue failure are observed. If the breakdown process has progressed to a point of ulceration, protection of the heel area of the patient is essential to healing.

Reducing or eliminating the time an individual spends in a supine position will protect the heel area, although it may increase the risk of skin failure on other areas of the foot and body. The current practice for protecting the heel area of a patient while in the supine position utilizes foot support to reduce or eliminate pressure and shear on the back of the heel. Such support is often provided by placing an ordinary pillow or folded towel under a calf area of the patient's legs. Several different foam boot designs are known that strap to the leg or foot to reduce the effects of heel pressure. In addition, a conventional mattress is known in which removable sections are provided in a foot area.

All of these conventional support methods require a caretaker to add or remove components from the bed in order to control pressure on the heels of the patient. Components which are removed from the bed have the potential to get lost or mislaid. Components that are added to the bed provide an extra cost associated with the purchasing, cleaning, and disposal of the added components. There is also a cost in time for the caregiver who must go through multiple steps to initiate and maintain the support of the device.

According to the present invention, a patient support having an adjustable length deck is provided. The patient support includes a deck support frame, a deck, a head board positioned adjacent a head end of the deck, and a foot board positioned adjacent a foot end of the deck. The deck includes a first section connected to a remainder of the deck, a second section movable in a common plane with the first section, and a first actuator directly connecting the first and second sections.

According to one aspect of the present invention, a patient support having an adjustable length deck is provided. The patient support includes a deck support frame, a deck, a patient rest surface configured to support a patient thereon, and a plurality of siderails configured to block egress of a patient from the patient rest surface. The deck includes a first section connected to a remainder of the deck, a second section movable in a common plane with the first section, and a linear actuator connecting the first and second sections and configured to move the second section relative to the first section between an extended position and a retracted position.

According to another aspect of the present invention, a patient support is provided including a mattress support and a mattress. The mattress support includes a main section and an extendable section movable relative to the main section between extended and retracted positions relative to the main section. Movement of the extendable section to the extended position exposes an exposable portion of the mattress support. The mattress has a main portion positioned over the main section of the mattress support and an extension portion positioned over the exposable portion of the mattress support when the extendable section is in the extended position. The extension portion has a width that is substantially equal to a width of the main portion adjacent to the extension portion.

According to another aspect of the present invention, a patient support is provided that includes a mattress support and mattress. The mattress support includes a main section and an extendable section movable relative to the main section between an extended position and a retracted position. The mattress support has an extended length when the extendable section is in the extended position. The mattress support has a retracted length when the extendable section is in the retracted position. The extended length is greater than the retracted length. The mattress has a main portion positioned over the main section and an extension portion movable between a first position positioned on the extendable section when the extendable section is in the extended position and a second position spaced apart from the extendable section when the extendable section is in the retracted position with the main portion positioned over the main section. The extension portion of the mattress has a thickness less than a thickness of the main portion.

According to another aspect of the present invention, a patient support is provided including a mattress support, a mattress supported by the mattress support, and a plurality of siderails positioned to block egress of a patient from the mattress. The mattress support includes a main section and an extendable section positioned adjacent to the main section. The mattress support has an extended length when the extendable section is in an extended position. The mattress support has a retracted length when the extendable section is in the retracted position. The extended length is greater than the retracted length. A segment of the main section of the mattress support supports the mattress at a first elevation relative to a floor when the main section is substantially horizontal. The extendable section of the mattress support is configured to support the mattress at a second elevation relative to the floor when the extendable section is substantially horizontal. The second elevation is greater than the first elevation.

Other features of the present invention will become apparent from the following detailed description of the invention when considered in conjunction with the accompanying drawings.

BRIEF DESCRIPTION OF THE DRAWINGS

A detailed description particularly refers to the accompanying figures in which.

DETAILED DESCRIPTION OF THE PREFERRED EMBODIMENTS

Figure 4:
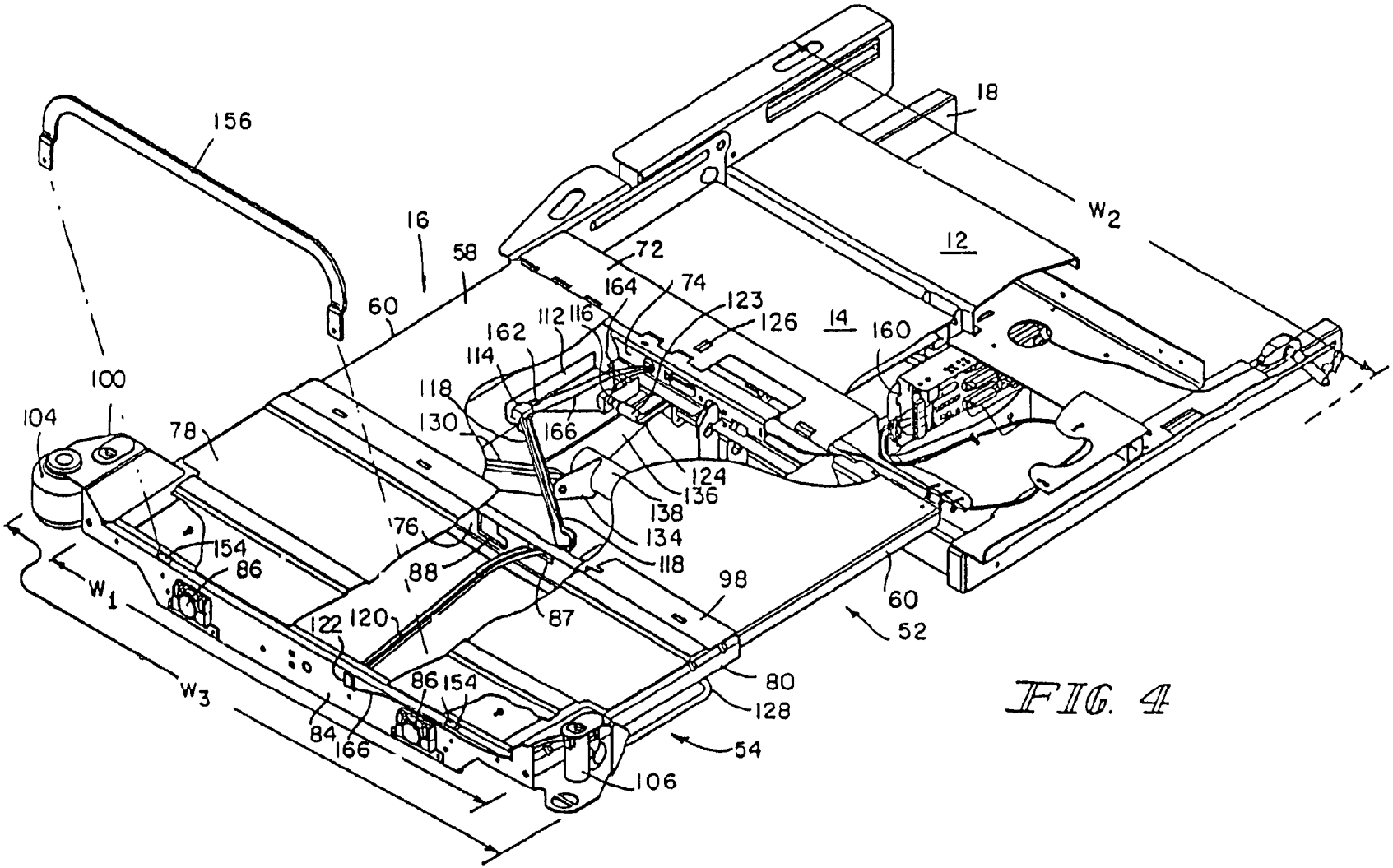
FIG. 4 is a perspective top view of the foot section of the deck according to the present disclosure and connected to the remainder of the deck.

As illustrated in the Figures, the bed will be discussed with respect to a deck 10 and a mattress 20 thereon. As illustrated in FIG. 4, the deck 10 includes a seat section 12, a thigh section 14 and a foot section 16 mounted to a frame 18. The deck would also include, but not shown, a head section also connected to the frame 18. Since the present disclosure is directed specifically to the foot section 16, the other portion will not be described in detail. The foot portion 16 may be used on any deck structure.

Figure 19:
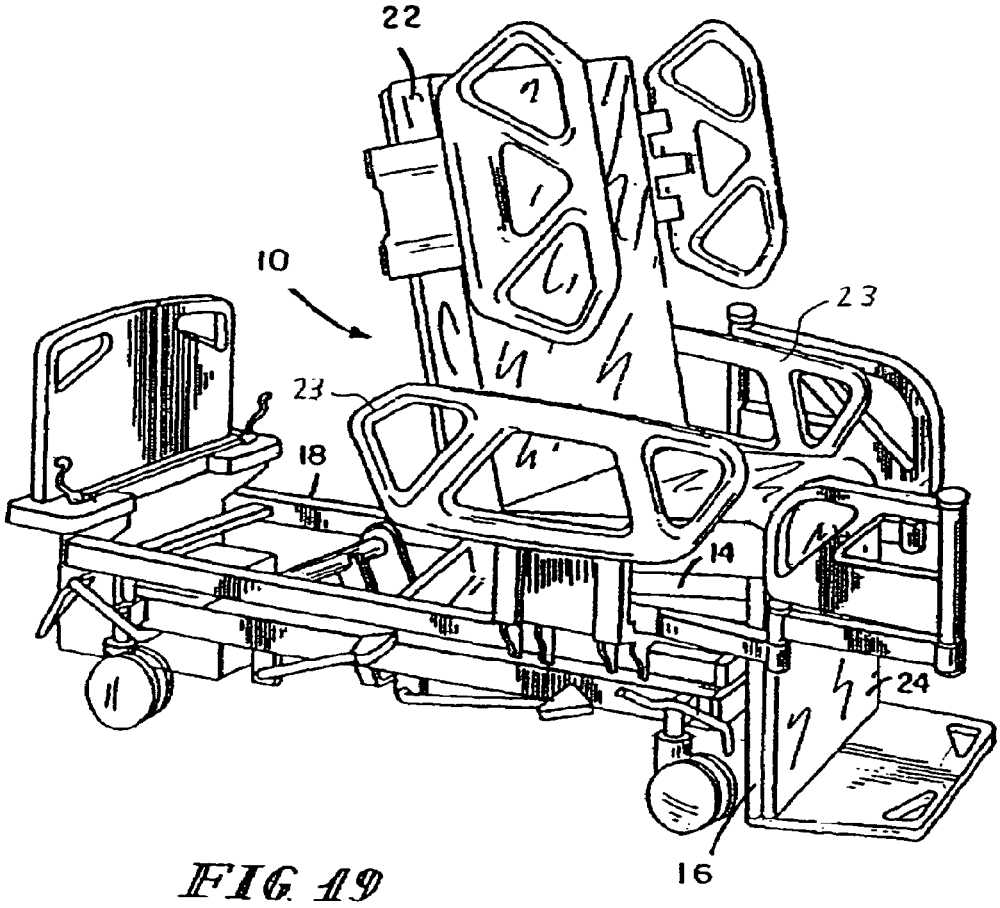
FIG. 19 is a perspective view of the bed showing the deck in a chair configuration.
Figure 20:
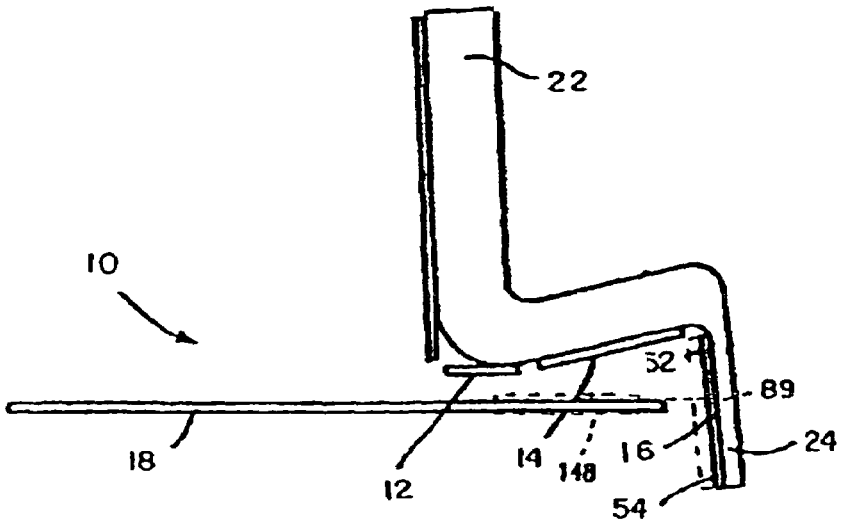
FIG. 20 is a diagrammatic view of the bed showing the deck in the chair configuration.
Figure 21:
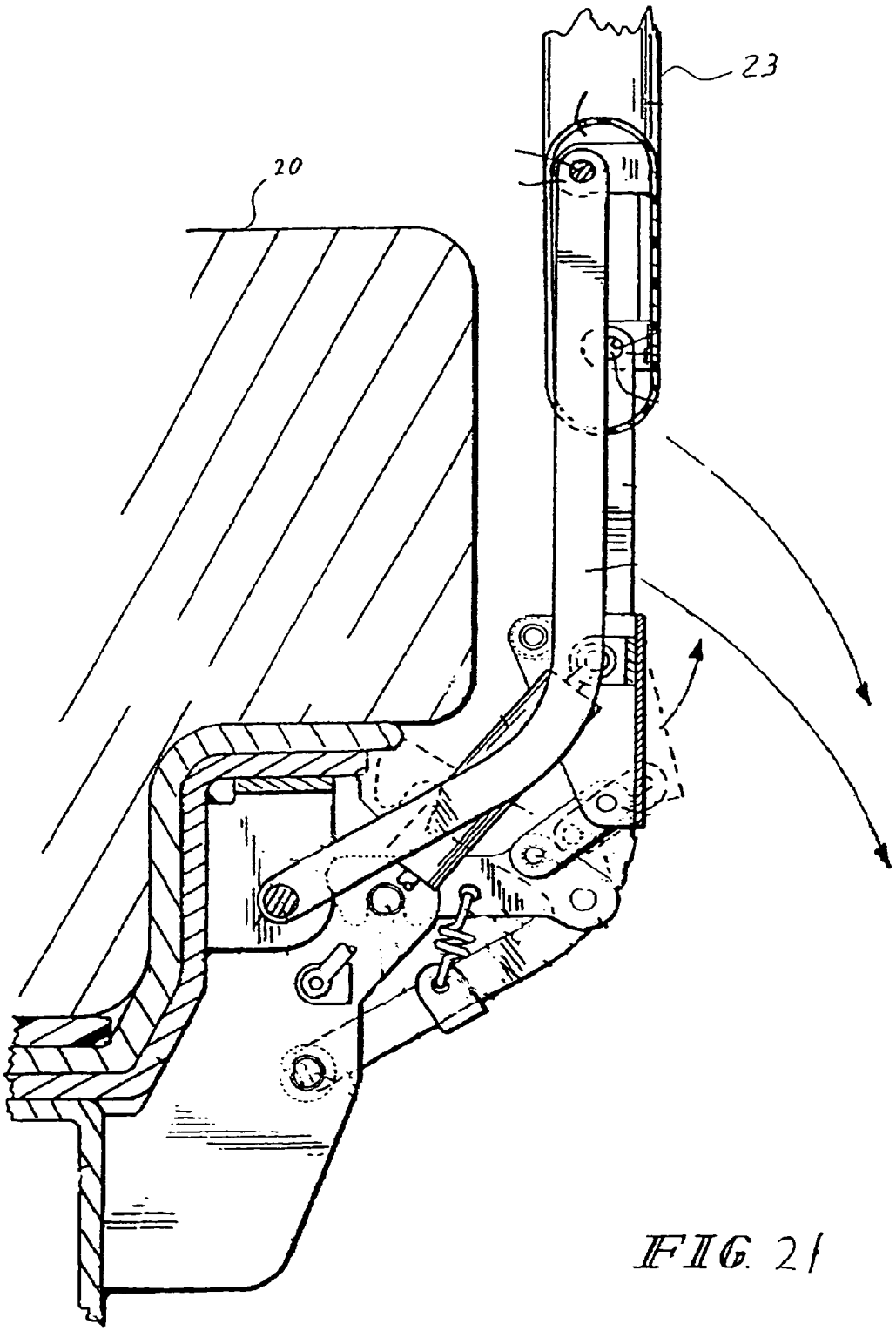
FIG. 21 is a sectional view of a side rail according to the principles of the present disclosure.
Figure 22:
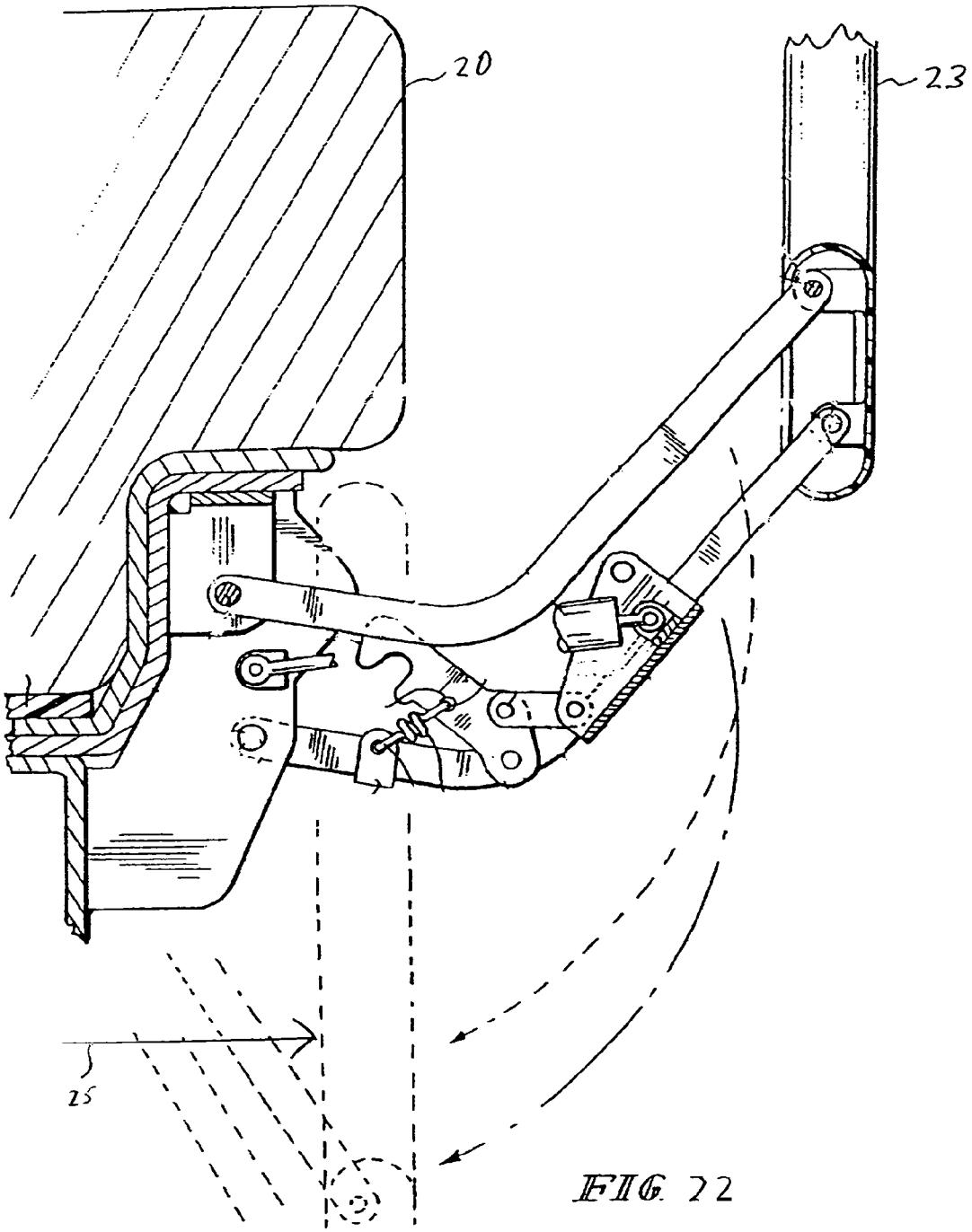
FIG. 22 is the side rail of FIG. 21 shown being moved away from and stored underneath the deck (in phantom).

The retracting foot section of the present disclosure can be retracted while the bed is in its horizontal bed position. This permits the caregiver to adjust the overall length of the bed in either the bed position or the chair position as shown in FIGS. 19 and 20. The overall bed length can be shortened by about 12–14 inches to facilitate transport of the bed. In other words, the retracting foot section reduces the bed length so that the bed can fit into smaller elevators. The shorter bed also has a smaller turning radius. The foot section can also be moved to its retracted position to save space during storage of the bed.

The retracting foot section of the present disclosure also decreases patient migration since the foot prop location may be adjusted to the height of the patient. Therefore, the bed size can be customized for the patient. The bed also includes a shearless pivot linkage disclosed in copending application Ser. No. 08/511,711, filed Aug. 4, 1995, the specification of which is incorporated herein by reference. The combination of the shearless pivot with the retracting foot section and foot prop reduces patient migration toward the foot end of the bed as the bed articulates.

Figure 1:
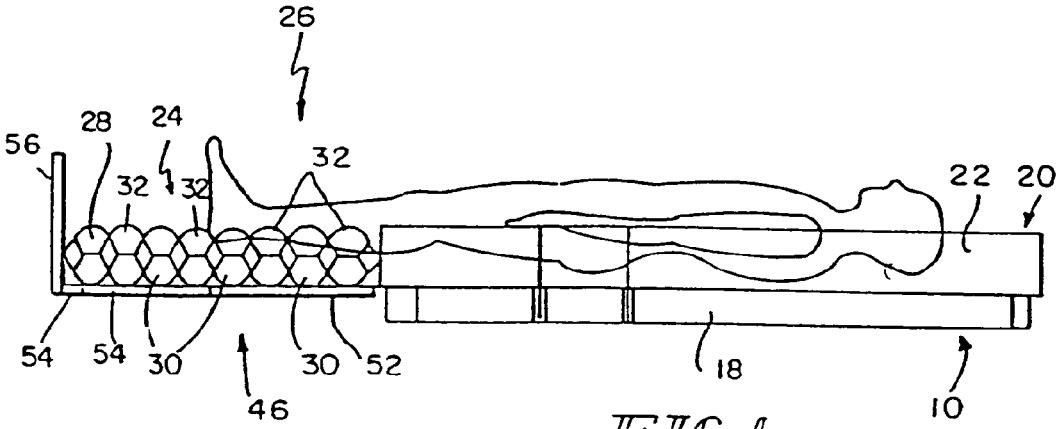
FIG. 1 is a schematic view of a patient on a bed with the foot section/portion fully extended.
Figure 2:
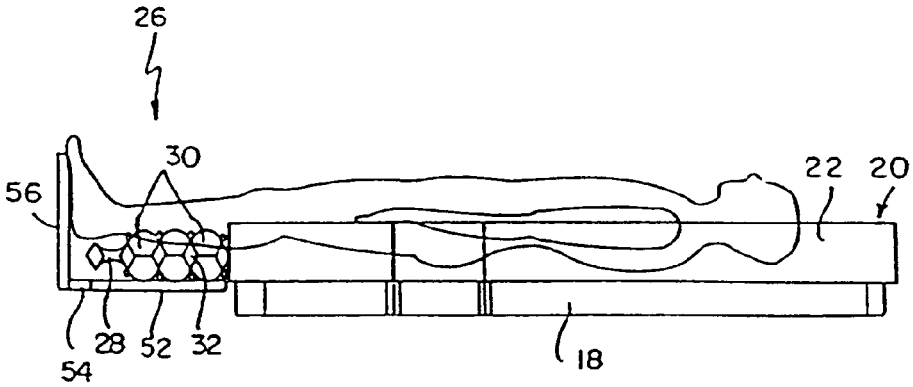
FIG. 2 is a schematic view of a patient on a bed with the foot section/portion adjusted and illustrating the heel management according to the principles of the present disclosure.
Figure 3:
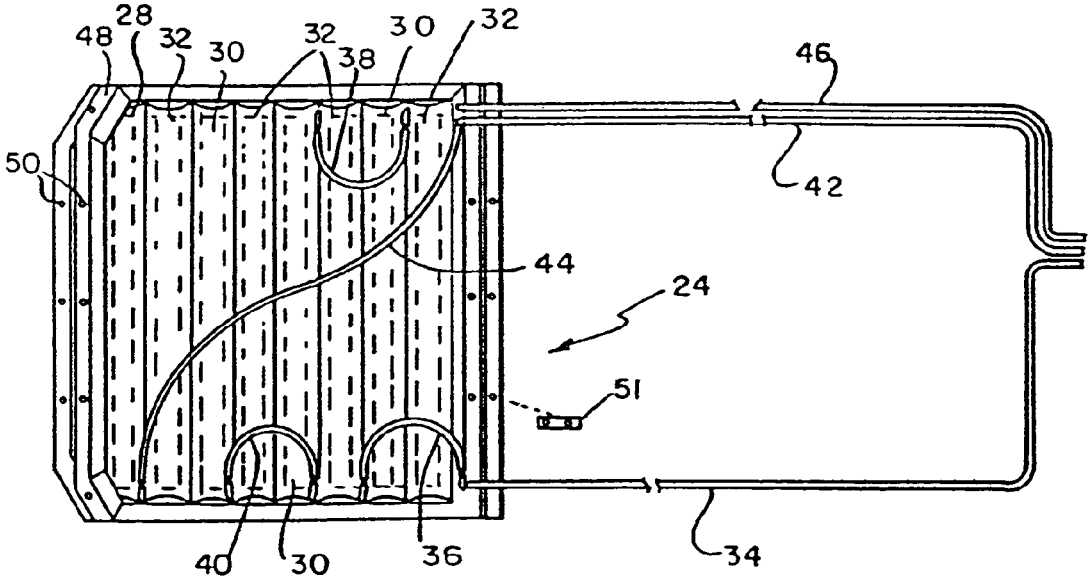
FIG. 3 is a bottom view of the foot section of a mattress according to the principles of the present disclosure.

The mattress 20 illustrated in FIGS. 1 and 2 includes a body support portion 22 and a foot portion 24. The foot section 24 includes a calf portion 26 which is variable in length and thickness and a heel portion 28 which is variable in thickness. One preferred embodiment of the mattress foot portion 24 is illustrated in FIGS. 1–3 as including a plurality of bladders. A plurality of variable thickness bladders 30 are separated by variable length bladders 32. The heel bladder 28 is separated from one of the variable thickness bladders 30 by a variable length bladder 32. The uniaxial variable bladders are produced by gussets in the bladders.

Referring to FIG. 3, a control line 34 is connected to the foot mattress portion 24 and by line 36 to the first variable thickness bladder 30. A line 38 at the other end of the first bladder 30 is connected to the second bladder 30. Line 40 at the opposite end of the second bladder 30 connects the second bladder 30 to the third bladder 30. A control line 42 is connected to line 44 of the foot portion 24 which is connected at its other end to the heel bladder 28. A control line 46 is connected to the first variable length bladder 32. All of the variable length bladders 32 are connected about the periphery of the foot portion 24. A cover 48 for the foot portion is held together by snaps 50. Preferably, the cover 48 is a slip or a shear promoting material, for example, 30 denier ripstop nylon which aids the movement of the foot section in the mattress ticking. This removes the shearing between the occupant and the ticking as the length of the mattress is changed. A strap 51 is secured to the cover 50 by the snaps which are rivets and ties the foot section to an adjacent section 22 of the mattress.

The control lines 34, 42 and 46 are connected to a control module which selectively inflates and deflates the bladders. An example of the control module is that in U.S. Pat. No. 5,666,681 which is incorporated herein by reference. From the connection, all of the variable thickness bladders 30 are inflated and deflated simultaneously, all of the variable length bladders 32 are also inflated or deflated simultaneously. Alternatively, each of the variable length bladders may be individually controlled with additional control lines or other flow control mechanisms. All three types of bladders are independently controlled.

The foot section 16 of the deck includes a first section 52 connected to the frame 18 and the remainder of the deck and a second section 54 movable along the plane of the section 52. A foot prop 56 is mounted to the second foot section 54 and extends transverse to the plane of the foot sections 52 and 54.

To size the bed to the patient and provide heel management, an occupant is placed on the top surface of the mattress 20 as illustrated in FIG. 1 with the calf of the patient resting on the foot mattress portion 24. The foot deck section 54 is retracted onto the deck foot section 52 until the foot prop 56 is adjacent the foot of the occupant as illustrated in FIG. 2. Simultaneously, the length adjusting bladders 32 are deflated so that the length of the portion 26 of the mattress is decreased, placing the heel of the patient above the heel bladder 28. The heel bladder 28 is then deflated, decreasing its thickness such that the interference pressure on the heel of the patient is reduced. By independently controlling the length of the foot section of the deck, the length of the foot portion of the mattress and the thickness of the heel portion of the mattress, appropriate adjustment of the length of the bed is possible as well as heel management.

The foot section 16 of the deck may be pivotally connected to the frame so as to allow the foot section to drop and to be used in various styles of beds or chair beds as shown in FIGS. 19 and 20. A separate and distinct actuator would be provided for the pivotal movement as well as the articulation of the other deck sections. This allows adjustment of the foot section for the length of a patient and heel management independent of articulation of the deck and mattress as well as reducing the length and thickness of the foot portion of the mattress as the deck is converted to a chair.

The foot section 16 of the deck will be explained with respect to FIGS. 4–8. The first foot section 52 includes a top wall 58 and a pair of opposed lateral side walls 60. Mounted to the bottom surface of top wall 58 by welding for example, are a pair of guide tubes 62. An intermediate guide tube 64 is telescopically received with tube 62 and an end guide tube 66 is telescopically received in intermediate guide tube 64. As will be discussed below, the end guide tube 66 is secured to the second foot section 54. The pairs of telescopic guide tubes 60, 64 and 66 guide the relative movement of foot section 54 with respect to foot section 52. Plates 68 are connected between the guide tubes 62 and the bottom surface of the top plate 58. Thus, the foot section 52 has a trapezoidal shape. This trapezoidal shape with the larger of the two parallel surfaces being the top wall 58.

Also mounted to the under surface of the top wall 58 of the foot section is a hinge plate 70 which mates with a hinge plate 72 mounted to the deck frame 18. This pivotally mounts the foot section 16 of the deck to the frame 18. Mounted between the guide tube 62 are a pair of spaced end walls 74 and 76.

The second foot section 54 includes a top wall 78, a pair of side walls 80 extending therefrom and a pair of bottom walls 82 extending from side walls 80. The top, side and bottom walls are made from one continuous piece of material. The second foot section 54 is generally U-shaped with bottom flanges 82 forming a C-channel with the side walls 80 and top walls 78. Thus, the top and side walls of the foot section 54 encompass or surrounds a portion of the top and side walls of the foot section 52. The foot section 54 includes an end wall 84 connected to the top wall 78, the side walls 80 and the bottom walls 82. Tube mounting assembly 86 mounts one end of the guide tube 66 to the end wall 84 of the foot section 54.

Figure 5:
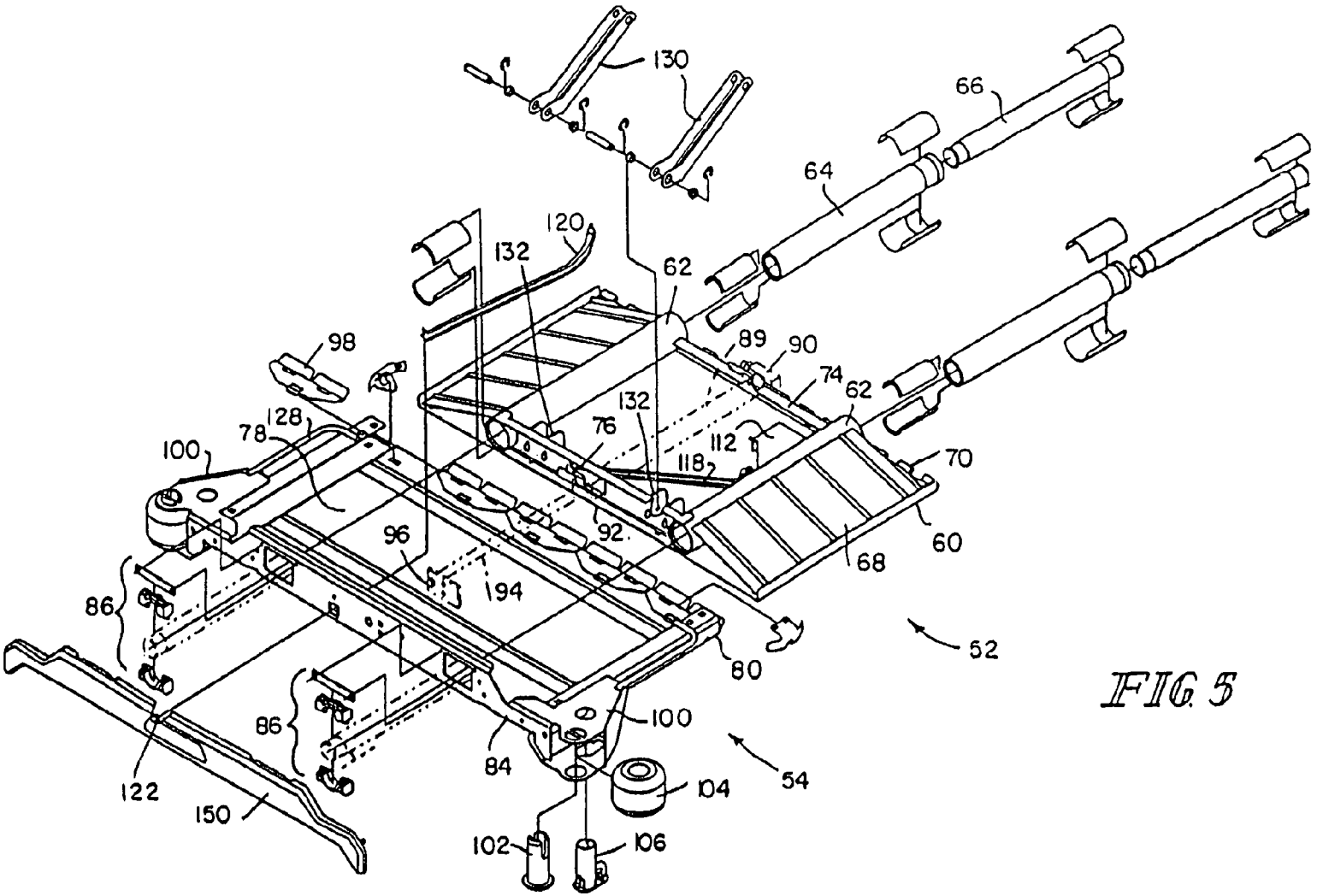
FIG. 5 is a bottom exploded view of a foot section of the deck of FIG. 4.
Figure 6:
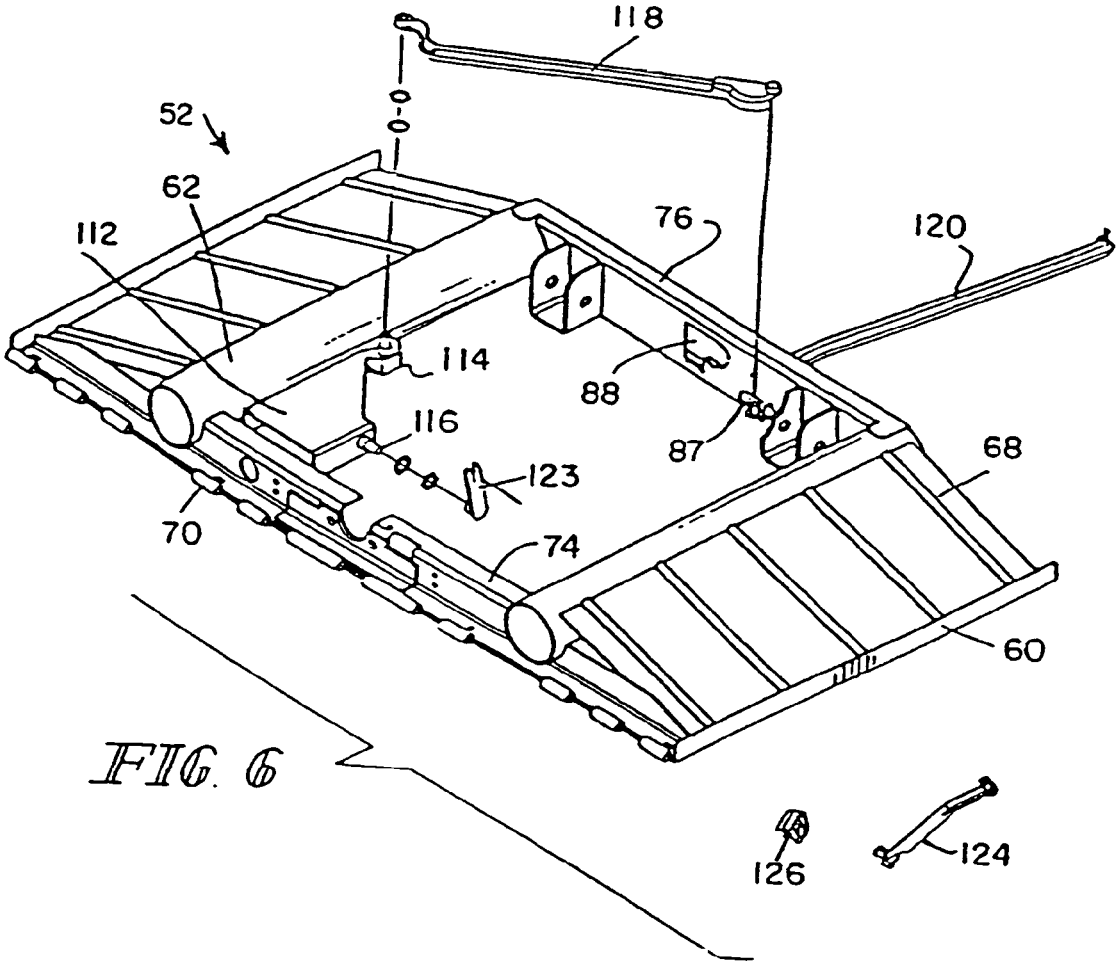
FIG. 6 is a bottom perspective view of 180° with respect to the respective view of FIG. 5 of one section of the deck of FIG. 5.

The end wall 76 of the foot section 52 includes openings 87 and 88, best seen in FIGS. 4 and 6, between the guide tube 62. An actuator 89 shown in phantom in FIG. 5 is connected to end wall 74 and has an input connections. The actuator 89 is preferably an air cylinder, and mounting connection 90 on end wall 74 is connected to a control line (not shown). The other end of actuator 89 is secured to wall 76 by bracket 92 in the opening 88. Arm 94 extending from actuator 89 is secured to wall 84 of the second foot section 54 by bracket 96. The actuator 89 is between the guide tubes 62, 64 and 60. The pair of guide tubes 62, 64 and 66 provide uniform distribution of forces. Also, the guide tubes support the weight of the occupant's feet and minimizes friction between the walls of the foot section 52 and 54. This prevents binding and rubbing between the foot section 52 and 54.

Plastic wipers 98 are also connected to the underside of top wall 78 of the foot portion 54 to protect the sliding joint between the foot sections 52 and 54 and also to prevent the sheet and mattress from intrusion into the joint and jamming the foot section adjustment.

Figure 7:
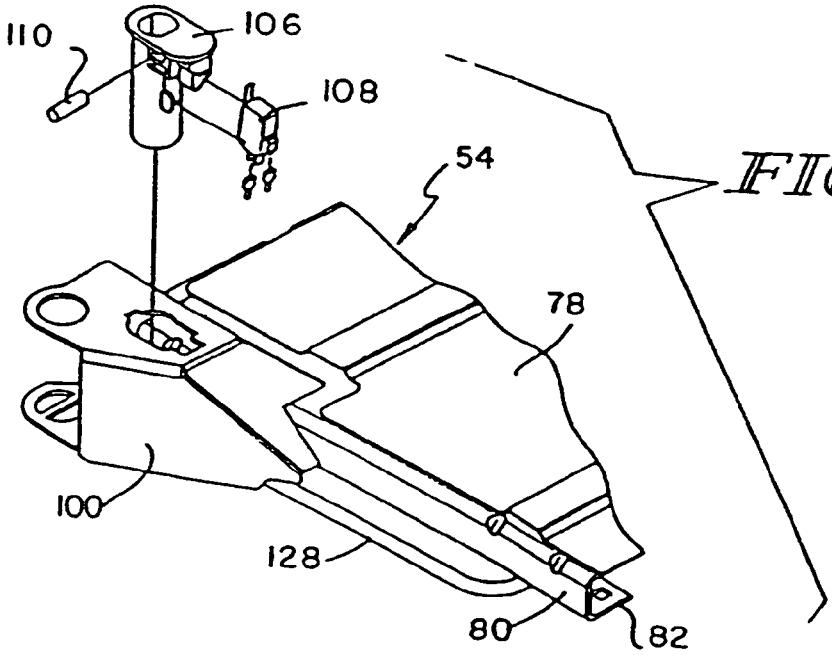
FIG. 7 is a top perspective view of the detail of the foot prop socket and safety switch according to the principles of the present disclosure.
Figure 8:
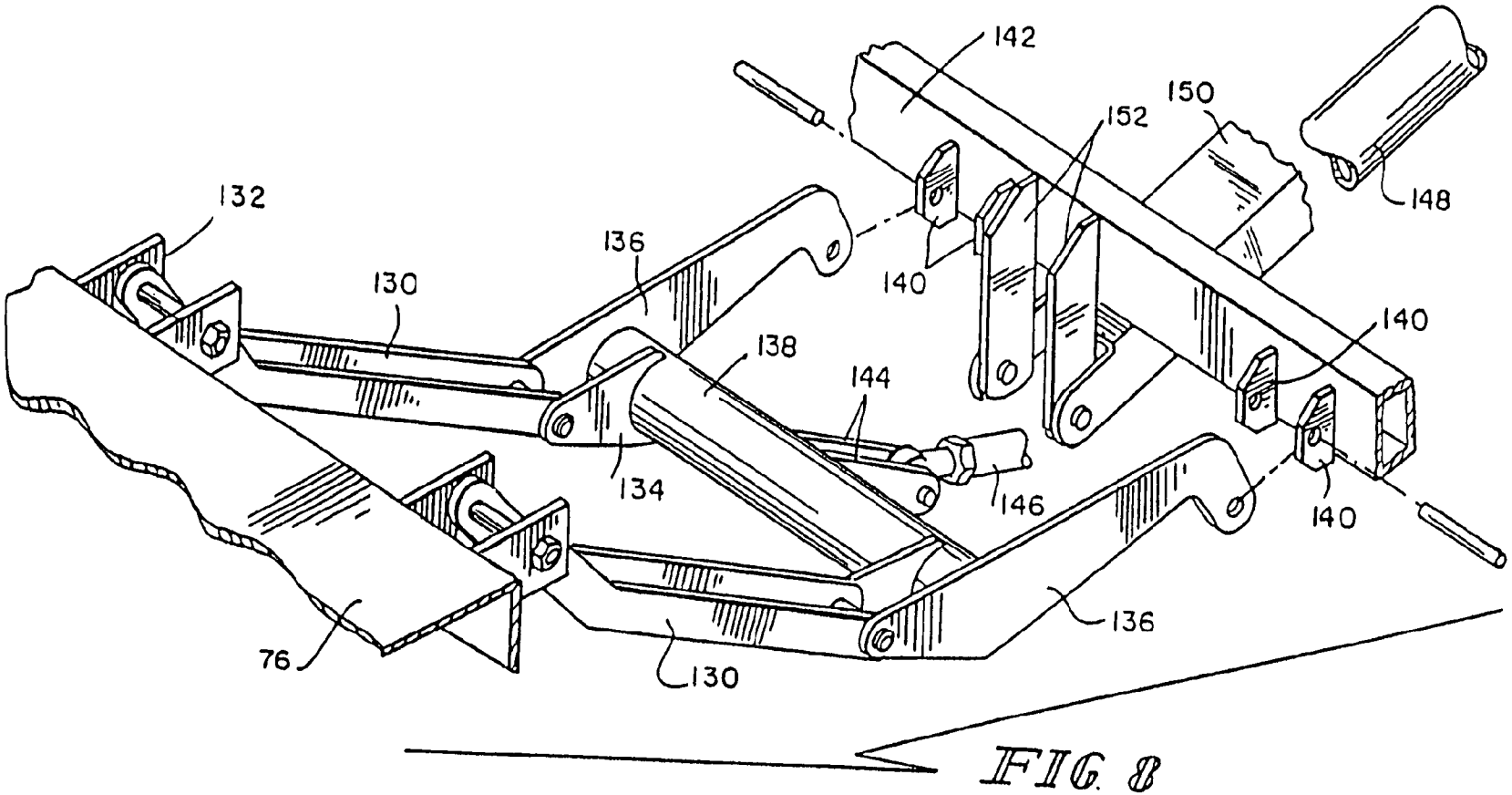
FIG. 8 is a perspective view of the rotating mechanism according to the principles of the present disclosure.
Figure 16:
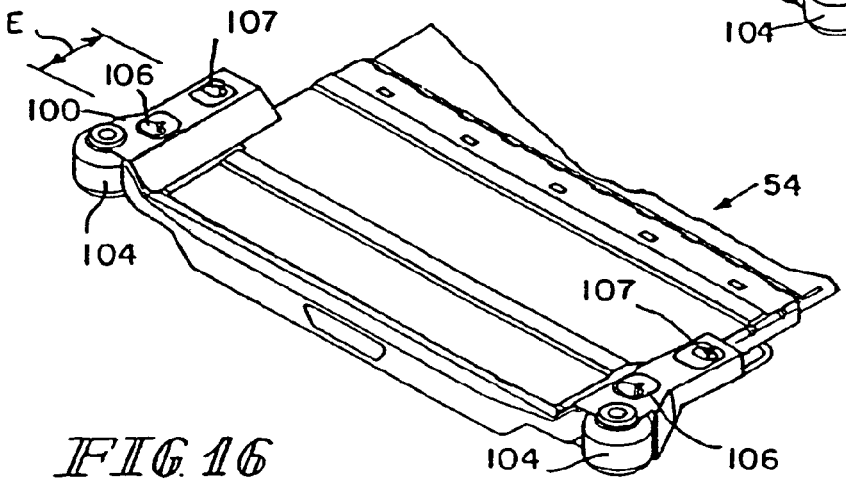
FIG. 16 is a perspective view of a modified foot section of the deck with a pair of foot prop sockets.

The foot section 54 includes lateral extensions 100. Bushing 102 mounts a bumper or roller 104 to the lateral extension 100. Socket 106 which receives the foot prop 56 is also included in the lateral extension 100. Alternatively, a pair of sockets 106 and 107 may be provided on each extension 100 as shown in FIG. 16. A switch 108 is mounted to the socket 106 by fastener 110 as illustrated in FIG. 7. Switch 108 indicates the presence of the foot prop in the end of the bed and is part of the control system. Alternatively, the switch 108 may be designed to also sense the presence of pressure on the foot prop produced by the foot of the occupant of the bed engaging the foot prop of the occupant of the bed.

Handles 128 are conveniently provided at the foot of the bed connected between the lateral extensions 100 and the foot section 54. A cover 150 is mounted to the end wall 84 of the foot section 54 as shown in FIG. 5. Slots 154 in the top of end wall 84 receives a stop 156 when the foot portion 24 of the mattress is made of foam as illustrated in FIGS. 10–13.

The width W1 of the foot sections 52 and 54 is substantially the width of the frame 18 and smaller than the width W2 of the frame 18 with its support surfaces. This accommodates side rails (not shown) mounted on the frame 18 in their lowered or tucked position as the foot section 16 pivots down. Width W3 of the foot section 16 with the lateral extensions 100 may be substantially equal to the width W2, since the extensions will pivot below the side rails.

The length of the foot deck section 16 as well as the angle of the foot section 16 with respect to the frame 18 are determined by length sensor 114 and angle sensor 116 mounted to the first foot section 52 at tube 62 by bracket 112. A sensor crank 118 is mounted to the length sensor 114 at one end and its other end is mounted to sensor link 120. The sensor link 120 extends through the opening 87 in the wall 76 and is connected at its other end to a pivotal connection 122 to the end wall 84 of the foot section 54. The length sensor 114 may be for example, a potentiometer wherein the crank 118 and link 120 rotate the potentiometer with a change of the length of the foot section 54 with respect to foot section 52.

A link 124 is connected to the angle sensor 116 at a first end by crank 123 and is pivotally connected at the second end to pivot leg 126 (shown in FIG. 6) mounted to hinge plate 72 (FIG. 4) which is connected to the deck frame 18. The angle sensor 116 may also be a potentiometer to determine the pivotal position of the foot section 16 with respect to the deck frame 18.

A pair of links 130 are pivotally mounted at one end to bracket 132 which is mounted to end wall 76 of the first foot section 52. The other end of links 130 are pivotally connected between brackets 134 and 136 mounted onto rod 138. The other end of brackets 136 is pivotally connected by brackets 140 to end wall 142 of the frame 18. Brackets 144 in the midsection of rod 138 connect rod 146 of actuator 148 to the rod 138. The other end of the actuator 148 is connected to the frame 18. A cover 150 has one end (not shown) connected to the frame 18 and its other end connected to brackets 152 which are mounted on end face 142 of the frame 18.

Figure 18:
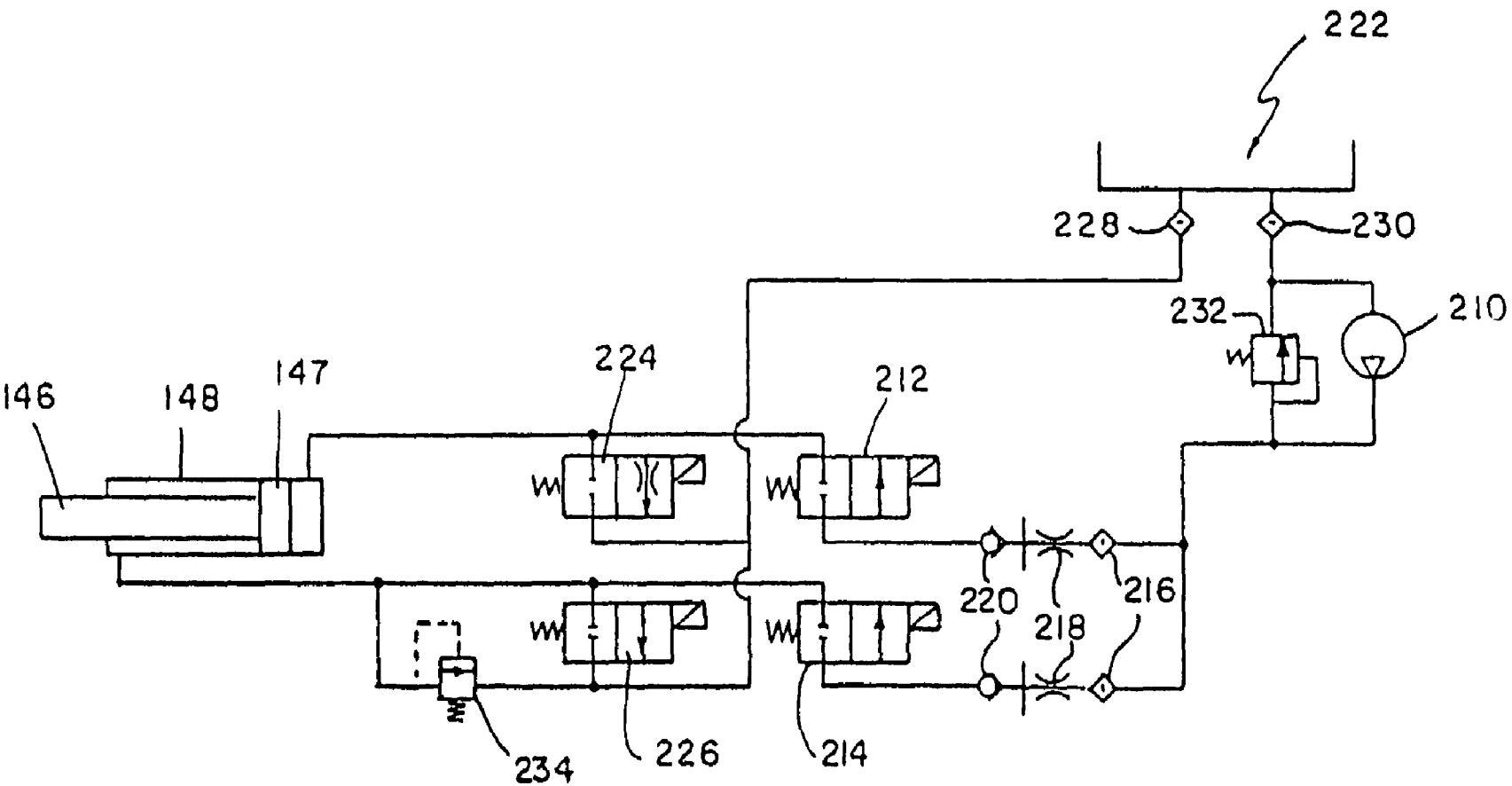
FIG. 18 is a schematic of the fluid controlled circuit for the foot angle actuator.

The actuator 148 determines the articulation or angular position of the foot section 16 of the deck. The actuator 148 illustrated in FIG. 18 includes rod 146 connected to piston 147. A pump 210 is connected to the opposite sides of piston 147 by raising valve 212 and lowering valve 214. Connected between the pump 210 and the valves 212 and 214 are filters 216, restriction 218 and check valves 220. Check valves 220 prevent the pressurized fluid in the actuator 148 from flowing back towards pump 210. The other side of piston 147 is connected to reservoir 222 by lowering return valve 224 and raising return valve 226. Filter 228 connects the reservoir 222 to the return valves 224 and 226 and a filter 230 connects reservoir 222 to the pump 210.

To extend the rod 146, electrical valves 212 and 226 are actuated to connect the respective sides to the pump 210 and reservoir 222. This raises the foot section 16. To lower the foot section 16, and retract the rod 146, electrical valves 214 and 224 are activated to respectively connect the opposite sides of the piston 147 to the pump 210 and reservoir 222. As a safety feature, relief valve 232 is connected between the output of pump 210 and the reservoir 222. Thus, if the pressure at the output of the pump builds up to an unsafe level, relief valve 232 provides a flow back to the reservoir 222.

As another safety feature, a relief valve 234 is connected between the output of valve 214 and the reservoir 222. Since valve 214 provides the output of the pump to the piston 147 to lower the foot section, if the pressure in the lowering should exceed the setting of relief valve 234, the excess pressure will be relieved back to reservoir 222. This is a safety feature in that if the foot section 16 engages an object in its lowering, the piston 147 and rod 146 will stop moving and pressure will build up on that side of the piston. To prevent crushing of an object or a person or part of a person, relief valve 234 will operate. As an alternative to the relief valve 234, a pressure sensor may also be provided and the valve 214 may be closed or valve 226 opened. By way of example only and not by way of limitation, whereas the relief valve 232 for the pump may be set at 900 PSI, the relief valve 238 for the actuator 148 may be set at approximately 180 PSI.

The electronics portion 160 of the controller as illustrated in FIG. 4 is mounted to the frame 18 below the seat section 12 and the thigh section 14 of the deck. The controller 160 is connected to the length sensor 114 by wire 162, to angle sensor 116 by wire 164 and to the prop sensor switch 108 by wire 166. The sensor crank 118 and sensor link 120 are hollow or U-channel and the wire 166 for the prop traverses the foot section 116 through the channel in the sensor crank 118 and sensor link 120. As the length sensor 114 sense the position of the end of the bed or it's length, the appropriate inflation or deflation of the bladders is made to adjust the length of the foot portion of the mattress. The angle sensor 116 in combination with the foot prop sensor 108 does not allow the foot section to pivot to an angle, for example in the range of 65° to 90° degrees from the horizontal, which will allow egress from the end of the bed without removal of the foot prop. This prevents the occupant from standing on the foot prop. Any angle less than this range will provide foot support in a chair position which is not selected for ease of egress.

Figure 9:
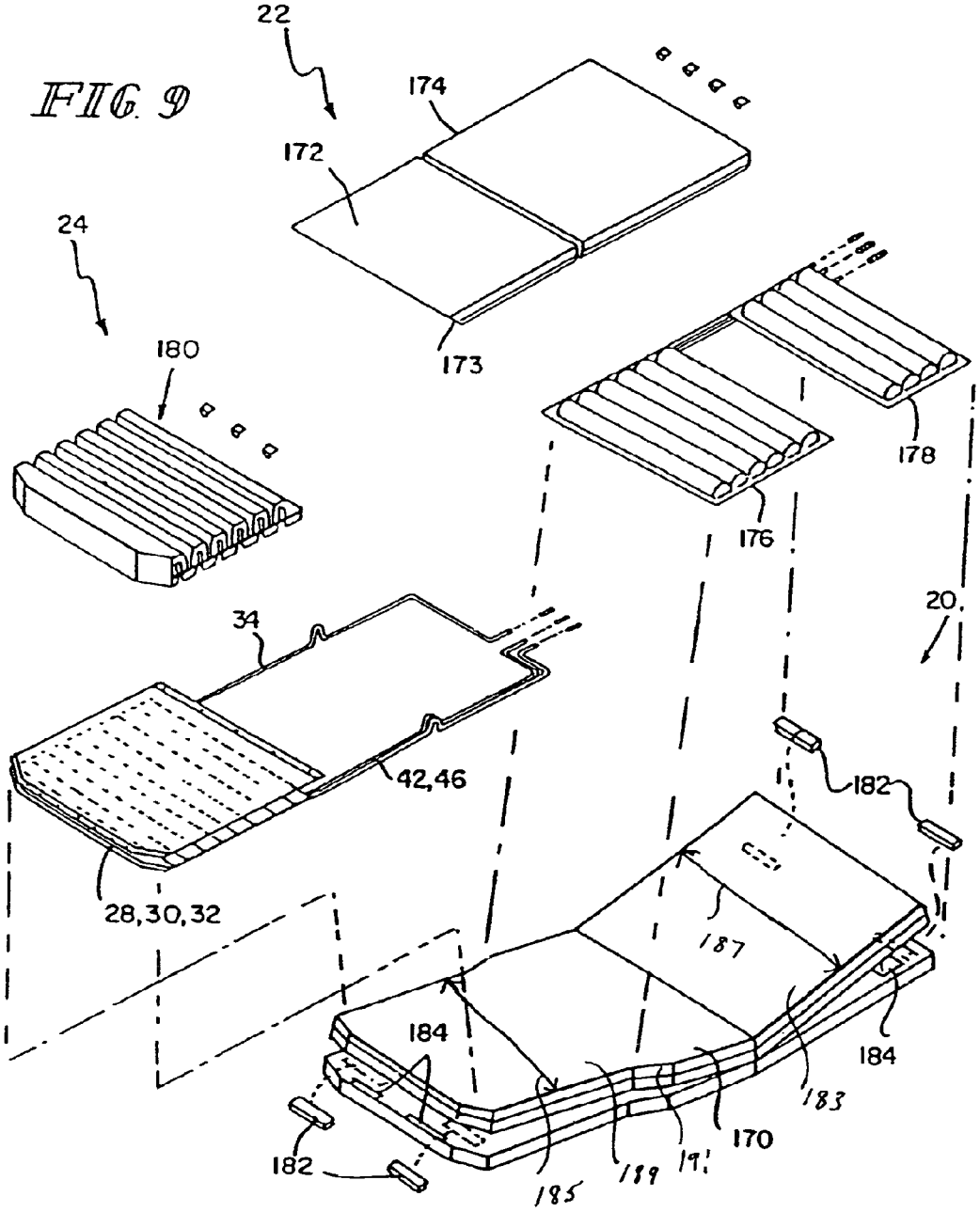
FIG. 9 is an exploded perspective view of a mattress according to the principles of the present disclosure.
Figure 10:
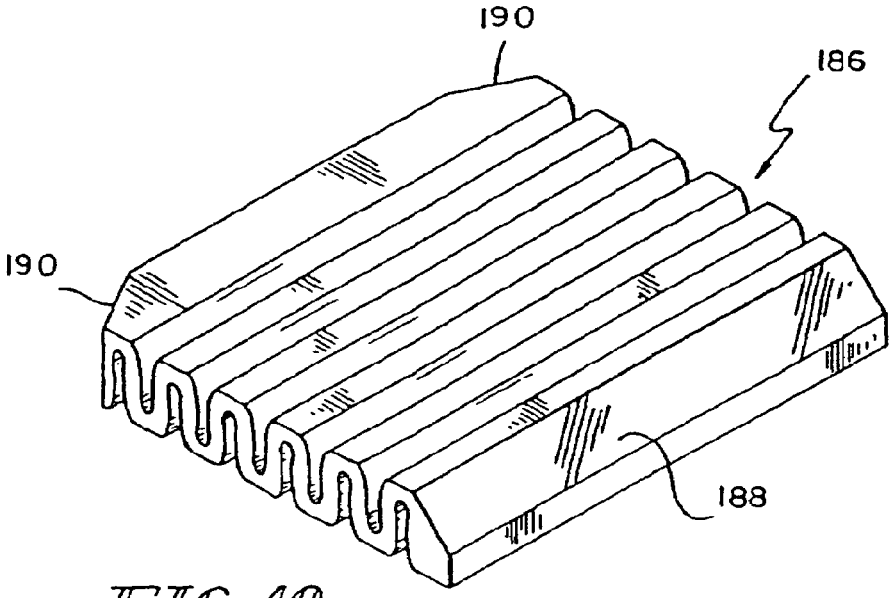
FIG. 10 is a perspective view of a foam foot portion of a mattress according to the principles of the present disclosure.

Details of the mattress 20 is illustrated in FIG. 9. Ticking 170 receives the body portion 22 and a foot portion 24. Two examples of each portion is illustrated. The body portion 22 could include a foam seat portion 172 and a foam back portion 174. Alternatively, it may include a bladder seat section 176 and a bladder back section 178. The foot section 24 could include a foam foot portion 180 or the bladder foot portion 28, 30 and 32 of FIG. 3. The control lines 34, 42 and 44 have a bend which corresponds to the juncture of the back and seat section of the mattress where a majority of the bending of the mattress occurs. Any combination of feet section may be used with any combination of seat and back section.

The body portion 22 and the foot portion 24 fit within the ticking 170. The ticking 170 is a stretchable, breathable thermal plastic which is impervious to bacteria. The seams of the outer ticking of the mattress are formed by continuous ultrasonic welding. Therefore, the seams do not require any stitches which can permit fluid leakage. The ultrasonically welded seams are impermeable to fluids and bacteria so that the seams of the ticking prevent leakage into an interior region of the mattress.

Figure 14:
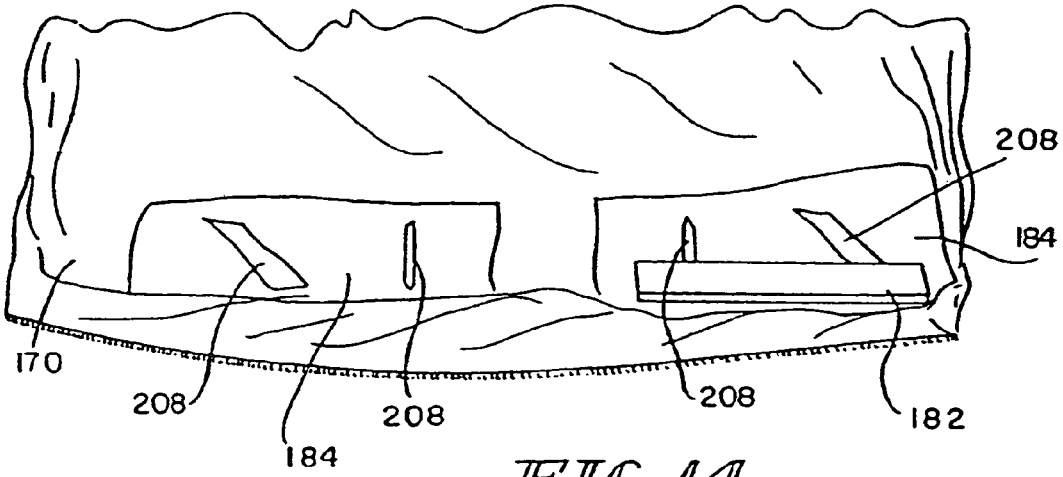
FIG. 14 is a partial perspective view of the foot end of a ticking for a mattress according to the principles of the present disclosure.

Magnets 182 are provided at the foot end and the head end of the ticking 170 in interior pockets 184 as illustrated in FIG. 14. These magnets secure the foot and head end of the bed to the frame or deck. If the frame is metal, no additional magnets are needed. If not, magnets are also provided on the supporting deck or frame.

The details of the foam foot portion 180 is illustrated in FIGS. 10–13. A foam core 186 is corrugated along its length or longitudinal axis. Preferably, the foam is low-ILD, visco elastic foam. Its ILD is in the range of 8–12 and is preferably 10. The length of the foam foot portion 186 may be, for example, 27 inches and is capable of being shortened to 13.5 inches. This is an example of one foot portion. The corrugation allows the foot portion to diminish in length. Also, the load-ILD allows the foot portion to compress upon the weight of the patient. This will help reduce the pressure on the heel. Also, by providing one of the valleys adjacent to the foot end of the foot portion 186, the heel may rest in the valley and therefore offer a valley or decreased area under the heel.

A portion of the foam 186 adjacent to the remainder of the deck is tapered at 188. This mates with a tapering 173 of the foam seat portion 172. This is to accommodate articulation between the foot portion and the seat or thigh portion. The foot end of the foam 186 has tapered corners 190. This allows them to lay adjacent to the foot prop 56.

Figure 11:
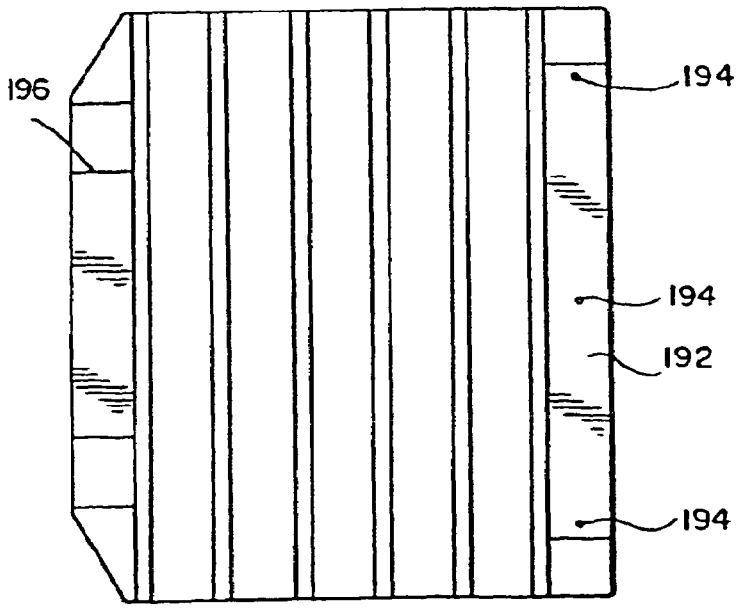
FIG. 11 is a bottom view of the foot portion of FIG. 10.

Bonded to the bottom of the core 186 adjacent to the deck end is a torque plate 192, as illustrated in FIG. 11. Prior to bonding, half of a male/female snap rivets 194 are inserted through the torque plate 192. An attachment plate 196 is also bonded to the bottom of the core 186 adjacent to the foot end. Only the cross-half section is bonded and the ends are left free as flaps.

Figure 12:
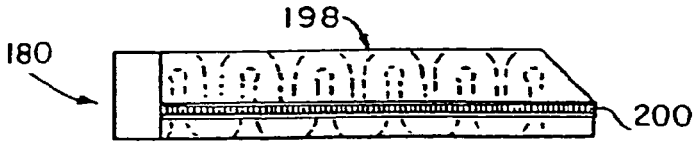
FIG. 12 is a side view of the foot portion of FIG. 10 with a cover according to the principles of the present disclosure.
Figure 13:
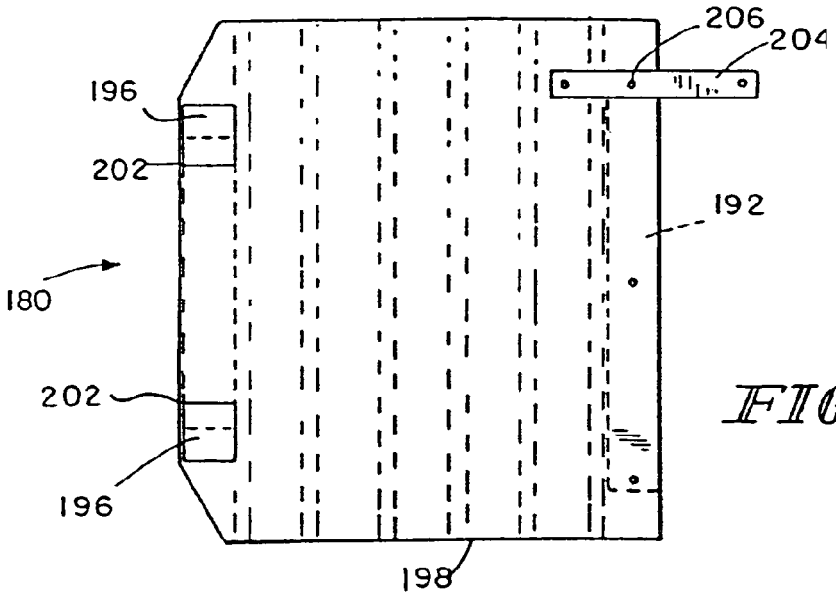
FIG. 13 is a bottom view of the foot portion of FIG. 12.

The core 186 is provided within a slip cover 198 which includes a zipper 200 as illustrated in FIGS. 12 and 13. The cover 198 preferably is a shear promoting material, for example, 30 denier ripstop nylon which aids the movement of the foam foot portion in the ticking 170. The flaps of attachment plate 196 extend through slots 202 in the bottom of the slip cover 198. This secures the foot end of the core 186 to the slip cover 198. The other end of the core 186 is secured within the cover 198 by snap rivets 206 extending through straps 204 and to be received in the mating snap 194 of the torque plate 192. The straps 204 secure the foam of the foot portion 180 to the adjacent seat portion of the mattress within the ticking 170. The flap ends of the attachment plates 196 extending through the cover 198 are also received in slots 208 of pockets 184 as are the magnets 182 of FIG. 14.

Figure 15:
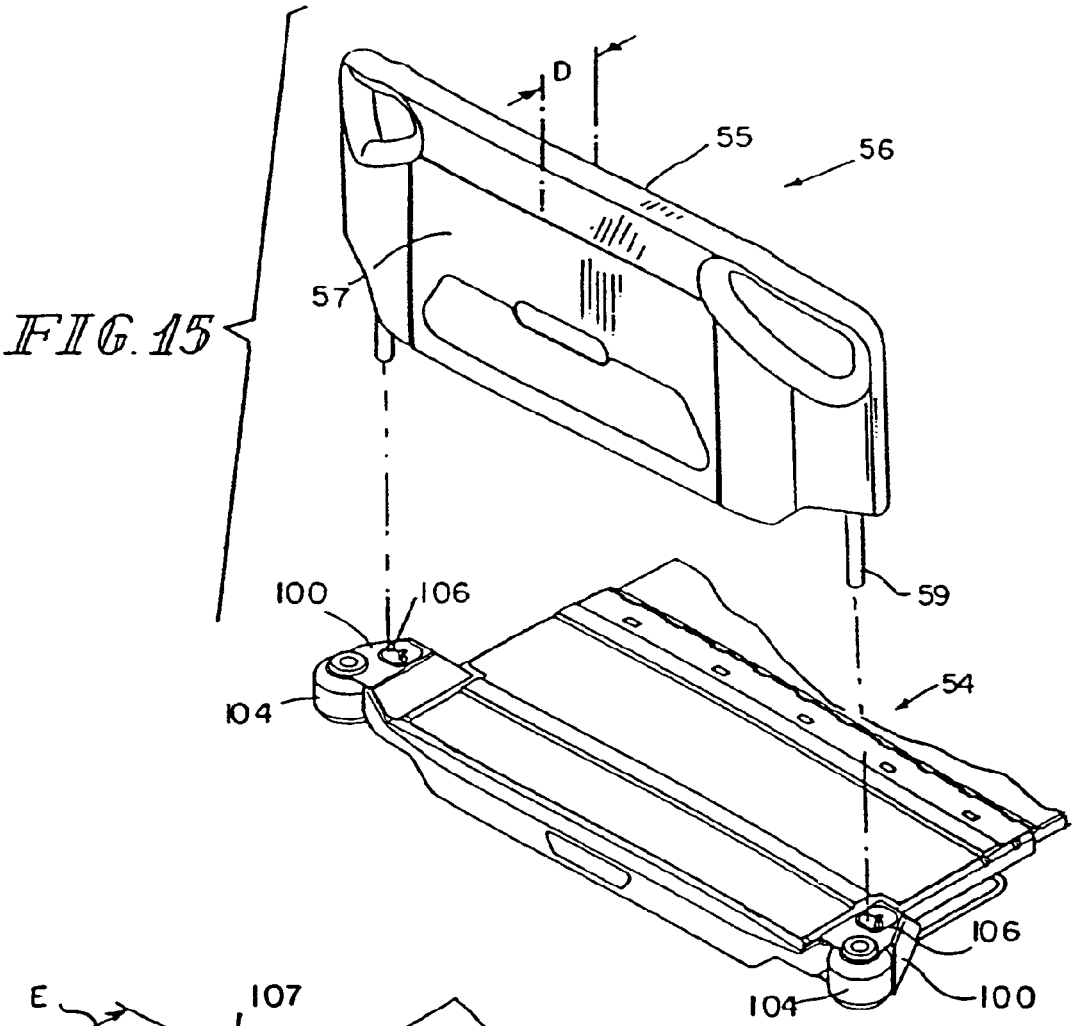
FIG. 15 is a perspective view of the foot section of the deck and a foot prop.

As illustrated in FIG. 15, the foot prop 56 has opposed foot support surfaces 55 and 57. The general shape of the foot prop 56 is trapezoidal in cross-section. The distance D between the parallel surfaces 55 and 57 may be, for example, 2½ inches. A pair of rods 59 extend from the bottom surface of the foot prop 56 and are received in sockets 106 in the second foot section 54. Although the foot section 16 is shortened or retracted when the deck rotates from its flat or planar position to the chair position, for very short occupants, the foot prop 56 would still not provide support for the feet of the short occupant. In such a case, the foot prop 56 can be rotated 180° with respect to that shown in FIG. 15 such that the planar surface 57 would be the foot support surface. It would be 2 inches closer to the patient than if surface 55 was the foot support surface.

As an alternative, a pair of sockets 106 and 107 spaced along the length of the foot section may be provided in each extension 100 as illustrated in FIG. 16. The distance E between the sockets 106 and 107 again, may be, for example, 2½ inches. This will allow the foot prop 56 to be moved from sockets 106 to sockets 107 and thereby shortening the end by 2½ inches. Rotating the foot prop 56 such that the surface 57 becomes a support surface, would shorten it an additional 2 inches. Thus, an adjustment of 4½ inches can be obtained using the configuration of FIG. 16. Additional sockets may be provided to give additional adjustments.

It should also be noted that although the cross section of the foot prop 56 is shown as trapezoidal, any cross sectional configuration which provides a differential between the two opposed supporting foot surfaces may be used.

It is important that the foot prop 56 has the parallel surface 55 as a support surface when the deck is in its planar position and that it is in sockets 106. Otherwise, it would overlap the mattress and prevent the end section from inflating to the appropriate height. Sensors and controls can be provided in the sockets 106 and 107 as well as some sensible indicia on 59 to indicate which socket it is in and which surface, 55 or 57 is adjacent the foot. Once this is sensed, the inflation of the foot section would be prevented until either the foot prop 56 has been removed or it is in socket 106 with surface 55 being the foot support surface. Also, as previously discussed, the control should not allow the foot section to rotate beyond, for example, 65° with respect to the horizontal if the foot prop is mounted in either of the sockets 106 or 107. This allows the foot prop to be available when the foot section is in a chair position while preventing it from being used when the foot section is lowered to permit egress.

Figure 17:
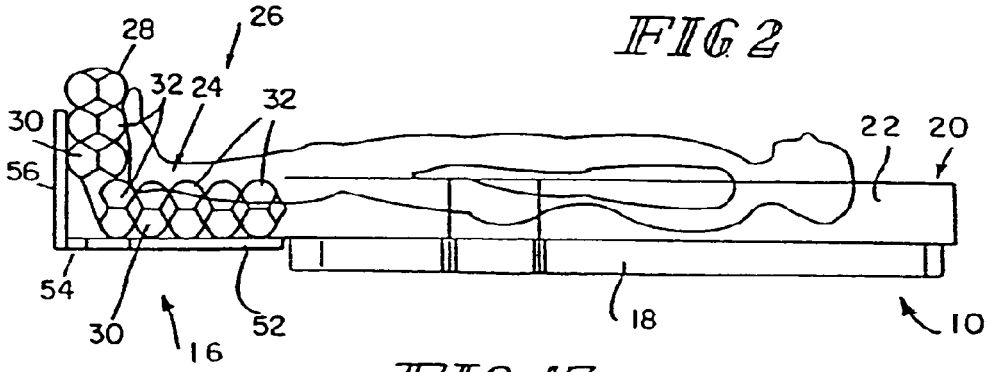
FIG. 17 is a view of the foot section of the deck shortened and the mattress foot section folded.

Another method of changing the position of the foot support surface of the foot prop 56 greater than that achieved by the adjustment of the foot section 16 of the deck is illustrated in FIG. 17. While the foot section 16 is adjusted from its extended to its contracted shortened position, the mattress foot portion 24 is not shortened nor made thinner. The non-shortened portion of the foot portion 24 of the mattress then extends up one of the support surfaces of the foot prop 56 and forming a foot support surface. If the thickness of the foot portion 24 of the mattress 20 is, for example, five inches, this will shorten the length of the foot section by five inches. Also, if the reversible foot prop, as illustrated in FIGS. 15 and 16 is used, this would add an additional 7½ to 9½ inches of adjustment.

Although FIG. 17 illustrates further decreasing the length of the deck in the planar or total horizontal position, the same adjustment can be made as the foot section of the deck and mattress are rotated down from the horizontal position towards the chair position. The controller would have to be modified so as to not simultaneously adjust the height or length of the foot section of the mattress 24 during the rotational and shortening of the foot section of the deck.

Although the present invention has been described and illustrated in detail, it is to be clearly understood that the same is by way of illustration and example only, and is not to be taken by way of limitation. The spirit and scope of the present invention are to be limited only by the terms of the appended claims.

The invention claimed is:

1. A patient support having an articulating deck, the patient support comprising:

a foot portion pivotally coupled to the deck, the foot portion including a first section and a second section;

an adjustable-length guide connecting the first section to the second section; and an actuator configured to move the second section relative to the first section from a first position to a second position, wherein the actuator is disposed underneath the deck.

2. The patient support of claim 1, further comprising a mattress support including a main section and an extendable section movable relative to the main section between extended and retracted positions, wherein movement of the extendable section to the extended position exposes an exposable portion of the mattress support.

3. The patient support of claim 1, further comprising first and second siderails movable between a raised position and a lowered position, the lowered position being underneath the deck.

4. The patient support of claim 1, wherein the first section of the foot portion is trapezoidal in cross section and has opposed surfaces, one of which includes a large surface and the other of which includes a small surface, the top side of the first section including the large surface.

5. The patient support of claim 1, wherein the actuator is operably coupled to one of the first and second sections.

6. The patient support of claim 1, further comprising a second actuator configured to move the deck between a plurality of orientations.

7. The patient support of claim 6, wherein one of the plurality of orientations is a chair orientation.

8. A patient support having an articulating deck, the patient support comprising:

a foot portion pivotally coupled to the deck, the foot portion including a first section and a second section;

an adjustable-length guide connecting the first section to the second section; and an actuator configured to move the second section relative to the first section from a first position to a second position; and a mattress having a main portion positioned over the main section of the mattress support and an extension portion positioned over the exposable portion of the mattress support when the extendable section is in the extended position, the extension portion having a width that is substantially equal to a width of the main portion adjacent to the extension portion.

9. A patient support having an articulating deck, the deck comprising:

a first section pivotally connected to the remainder of the deck;

a first actuator operably connected to the first section to pivot the first section relative to the remainder of the deck, [wherein the first actuator is a fluidly driven piston and the relief mechanism is a relief valve connected to the piston;] and a relief mechanism to deactivate the first actuator when the first actuator encounters a predetermined resistance, *wherein the first actuator is a fluidly driven piston and the relief mechanism is a relief valve connected to the piston*.

10. The patient support of claim 9, further including a second section movable in a plane relative to the first section; and a second actuator connected to the second section to move the second section relative to the first section.

11. The patient support of claim 9, wherein the relief mechanism is fluidically responsive to fluid pressure on the piston.

12. The patient support of claim 9, further comprising a sensor to sense the pressure on the piston and wherein the relief mechanism is an electro-fluid valve responsive to fluid pressure on the piston sensed by the sensor.

13. An adjustable-length patient support, comprising:

a articulatable frame including a head end, a seat section and a longitudinal axis, the articulatable frame being moveable to assume at least a bed position and a chair position, and a foot section pivotally coupled to the seat section, the foot section including a first section and a movable second section, the second section being retractable over the first section along the longitudinal axis to adjust the length of the patient support when the frame is in at least one of the bed position and the chair position, wherein the length of the foot section automatically extends when the frame is assuming the bed position and wherein the actuator includes a first end and a second end, the first end is coupled to the first section of the foot section, and the second end is coupled to the second section of the foot section.

14. The patient support of claim 13, wherein the patient support automatically retracts the second section of the foot section when the frame is assuming a chair position.

15. The patient support of claim 13, further comprising an actuator coupled to the foot section, the actuator being operable to move the second section relative to the first section.

16. The patient support of claim 13, further comprising at least one guide mounted to the first section of the foot section.

17. The patient support of claim 16, further comprising at least one telescoping guide received by the at least one guide.

18. An adjustable-length patient support comprising:

an articulatable frame including a head end, a seat section and a longitudinal axis, the articulatable frame being moveable to assume at least a bed position and a chair position, a foot section pivotally coupled to the seat section, the foot section including a first section and a movable second section, the second section being retractable over the first section along the longitudinal axis to adjust the length of the patient support when the frame is in at least one of the bed position and the chair position, wherein the length of the foot section automatically extends when the frame is assuming the bed position, and a pair of guides coupled to the foot section, wherein the actuator is located between the guides.

19. An adjustable length patient support comprising:

an articulatable frame including a head end, a seat section and a longitudinal axis, the articulatable frame being moveable to assume at least a bed position and a chair position, a foot section pivotally coupled to the seat section, the foot section including a first section and a movable second section the second section being retractable over the first section alone the longitudinal axis to adjust the length of the patient support when the frame is in at least one of the bed position and the chair position, and a length sensor coupled to the foot section.

20. An adjustable length patient support comprising:

an articulatable frame including a head end, a seat section and a longitudinal axis, the articulatable frame being moveable to assume at least a bed position and a chair position, a foot section pivotally coupled to the seat section, the foot section including a first section and a movable second section, the second section being retractable over the first section along the longitudinal axis to adjust the length of the patient support when the frame is in at least one of the bed position and the chair position, and controller electronics coupled to the frame to automatically adjust the length of the foot section.

21. A patient support comprising:

an articulating deck including a pivotally adjustable foot portion, the foot portion including a first section and a second section;

an adjustable-length guide connecting the first section to the second section; and an actuator configured to move the second section relative to the first section from a first position to a second position, wherein the actuator is disposed substantially underneath the articulating deck.

22. The patient support of claim 21, further comprising a mattress support including a main section and an extendable section movable relative to the main section between extended and retracted positions, wherein movement of the extendable section to the extended position exposes an exposable portion of the mattress support.

23. The patient support of claim 22, further comprising a mattress having a main portion positioned over the main section of the mattress support and an extension portion positioned over the exposable portion of the mattress support when the extendable section is in the extended position, the extension portion having a width that is substantially equal to a width of the main portion adjacent to the extension portion.

24. The patient support of claim 21, further comprising first and second siderails movable between a raised position and a lowered position, the lowered position being underneath the deck.

25. The patient support of claim 21, wherein the first section of the foot portion is trapezoidal in cross section and has opposed surfaces, one of which includes a large surface and the other of which includes a small surface, the top side of the first section including the large surface.

26. The patient support of claim 21, wherein the actuator is operably coupled to one of the first and second sections.

27. The patient support of claim 21, further comprising a second actuator configured to move the deck between a plurality of orientations.

28. The patient support of claim 27, wherein one of the plurality of orientations is a chair orientation.

* * * * *